United States Patent [19]

Katzakian, Jr. et al.

[11] 3,977,996

[45] Aug. 31, 1976

[54] CATALYSTS FOR THE OXIRANE-ANHYDRIDE REACTION

[75] Inventors: Arthur Katzakian, Jr., Sacramento; Herman H. Weyland, Morgan Hill; Roger B. Steele, Fair Oaks; Marvin H. Gold, Sacramento, all of Calif.

[73] Assignee: Aerojet-General Corporation, El Monte, Calif.

[22] Filed: June 3, 1974

[21] Appl. No.: 475,549

Related U.S. Application Data

[63] Continuation-in-part of Ser. No. 227,645, Feb. 18, 1972, abandoned, which is a continuation-in-part of Ser. No. 62,628, Aug. 10, 1970, abandoned.

[52] U.S. Cl.......................... 252/431 C; 260/47 EA
[51] Int. Cl.[2].......................................... C08F 4/22
[58] Field of Search ............ 260/47 EA; 252/431 C

[56] References Cited
UNITED STATES PATENTS

| | | | |
|---|---|---|---|
| 2,768,153 | 10/1956 | Shokal............................ | 260/47 EA |
| 2,947,712 | 8/1960 | Belanger et al. ................ | 260/47 EA |
| 3,374,193 | 3/1968 | Tsatsos et al................... | 260/47 EA |
| 3,404,185 | 10/1968 | Thomas et al. ................. | 252/431 C |
| 3,487,027 | 12/1969 | Case............................... | 252/431 C X |
| 3,586,658 | 6/1971 | Wooster......................... | 260/47 EA |
| 3,598,749 | 8/1971 | Cheng et al. ................... | 260/47 EA |
| 3,625,755 | 12/1971 | Potrafke......................... | 252/431 C X |
| 3,635,869 | 12/1972 | Steele et al.................... | 260/47 EA X |

FOREIGN PATENTS OR APPLICATIONS

| | | | |
|---|---|---|---|
| 586,027 | 10/1959 | Canada........................... | 260/47 EA |
| 588,142 | 12/1959 | Canada........................... | 260/47 EA |

*Primary Examiner*—Patrick P. Garvin
*Attorney, Agent, or Firm*—Marvin E. Jacobs

[57] ABSTRACT

This patent describes a method of catalyzing the reaction of organic polybasic acid anhydrides with at least one oxirane which comprises carrying out the reaction in the presence of an effective catalytic amount of a synergistic catalyst mixture comprising an active chromium III tricarboxylate salt having unoccupied coordination sites and any compound capable of polarizing the carboxylic acid anhydride to yield a reactive carboxylic acid moiety. Preferred compounds as the cocatalyst member include one or more members selected from the group consisting of the alkyl, aryl, aralkyl, and alkaryl tri-substituted compounds of the following types: quaternary ammonium hydroxides; quarternary phosphonium halides; arsines; amine oxides; sulfoxides; tertiary aminophenols; trihydrocarbon phosphine oxides; trihydrocarbon phosphines; tertiary amines, and combinations thereof, each alone or in combination with a phenol or other reactive promoter such as, carboxylic acids and alcohols; and compounds containing two or more co-catalytic functional groups in the same molecule such as alkyl phosphoramides, alone or in combination with any and all of (1) any of the members, (2) phenols or other reactive promoters. Also the invention pertains to a novel class of mixed catalysts which act synergistically for promoting the reaction of oxirane oxygen groups with curing (crosslinking) or chain extension agents.

12 Claims, No Drawings

CATALYSTS FOR THE OXIRANE-ANHYDRIDE REACTION

This application is a continuation-in-part of our co-pending application Ser. No. 227,645, filed Feb. 18, 1972, now abandoned which in turn is a continuation in part of Ser. No. 62,628 filed Aug. 10, 1970 now abandoned.

BACKGROUND OF THE INVENTION

Anhydride-cured epoxies are characterized by good overall physical, electrical and chemical properties as well as by high heat-distortion temperatures which in many cases exceed the best values of aromatic diamine-epoxy systems. Another decided advantage is that, unlike amine-curatives, the anhydrides are not skin sensitizing compounds. The main disadvantage of anhydride-epoxy systems is their long cure cycle at elevated temperatures with the subsequent risk of vaporization and loss of curing agent. While active chromium III tricarboxylate salts having unoccupied coordination sites have been found to greatly accelerate the curing of organic acid-epoxy compound reactions, (These catalysts are disclosed and claimed in another copending application, Ser. No. 389,079 filed Aug. 17, 1973 and, per se, do not form a part of the present invention) these catalysts alone are not suitable catalysts for the reaction of anhydrides with oxiranes. With such catalysts, relatively long cure cycles at higher temperatures are required and the cured resins are of poor quality.

The present invention provides a new group of synergistic catalyst mixtures for promoting rapid reactions of oxirane compounds with crosslinking agents and chain extension agents. According to the present invention oxirane curing can take place at relatively low temperatures, such as below 100°C and even as low as room temperature.

SUMMARY OF THE INVENTION

Briefly, the present invention comprises a novel synergistic, oxirane soluble, catalyst mixture containing active chromium III tricarboxylate salt(s) having unoccupied coordination sites and any compound capable of polarizing the carboxylic acid anhydride to yield a reactive carboxylic acid moiety. Preferred compounds as the cocatalyst member include one or more members selected from the group consisting of quaternary ammonium hydroxides; quaternary ammonium, halides, quaternary phosphonium halides; tertiary arsines; tertiary amine oxides; trihydrocarbon phosphine oxides, trihydrocarbon phosphines; tertiary amines; and each alone or in combination with a phenol or other reactive promoters; such as carboxylic acids or alcohols; and compounds containing two or more co-catalytic functional groups in the same molecule (such as alkylphosphoramides) alone or in combination with any and all of (1) any of the members, (2) phenols or other reactive promoters. The invention additionally comprises the method of curing an epoxy compound, normally containing more than one oxirane ring, with curing (crosslinking) agents such as organic poly-basic acid anhydrides in the presence of an effective catalytic amount of the abovementioned catalyst mixture. The invention also relates to the new compositions which consist essentially of the chromium compounds aforesaid and their cocatalyst member(s).

It is a principal object of this invention to provide novel synergistic catalyst compositions for use in oxirane chain extension and crosslinking (curing) reactions.

Another object of this invention is to provide a novel synergistic catalyst mixture which accelerates the curing reaction of epoxides with carboxylic acid anhydrides.

Still another object of the invention is to provide a novel method of curing epoxy resins employing a synergistic catalytic mixture.

More particularly, it is an object of this invention to provide a novel method of curing organic acid anhydride-epoxy resin systems employing novel synergistic mixtures of catalysts comprising a member selected from the group consisting of quaternary ammonium hydroxides and halides; quaternary phosphonium halides; arsines; amine oxides; trihydrocarbon phosphine oxides, trihydrocarbon phosphines, tertiary amines; and mixtures thereof; each alone or in combination with a phenol or a reactive accelerator such as carboxylic acids or alcohols; and compounds containing two or more co-catalytic functional groups in the same molecule such as alkylphosphoramides, with one or more active chromium III tricarboxylates.

These and other objects of our invention are in part obvious and will in part become apparent from the more detailed description which follows.

DESCRIPTION OF THE PREFERRED EMBODIMENTS

The total amount of the mixed catalyst employed is normally on the order of from about 0.1 to about 10% by weight of the total reactant system. Excellent synergistic results are obtained when the catalyst mixture employed contains from about 15 to 85% by weight of the active chromium III salt and from 85 to 15% by weight made up of the co-catalyst(s). On a molar basis, the preferred ratio is one mole of active chromium compound to about two equivalents of co-catalyst functions. Variations in molecular weights of the catalyst components is the reason for the employment of the weight range of each component.

The active chromium III catalyst is prepared as described in the following examples:

EXAMPLE I

PREPARATION OF NON-CATALYTIC AQUATED CHROMIUM III TRI-2-ETHYLHEXANOATE

A solution of 120 g (3.0 moles) of sodium hydroxide was dissolved in 500 ml of distilled water. 2-Ethylhexanoic acid (491 g. 3.3. moles) was added with stirring to form sodium 2-ethylhexanoate. In a separate container 200 g (0.5 mole) of chromium nitrate nonahydrate was dissolved in 500 ml of distilled water. The chromium nitrate solution was slowly added to the sodium 2-ethylhexanoate solution with good stirring. When the addition was complete, 500 ml of hexane were added and stirring was continued for 10 minutes. The layers were separated and the hexane layer containing the aquated chromium III tri-2-ethylhexanoate was washed with dilute sodium hydroxide solution, water, dilute sodium carbonate solution and finally with distilled water. The hexane solution was then dried over anhydrous magnesium sulfate. Most of the hexane was removed under reduced pressure and the resulting concentrate was slowly added to 500 ml of acetone. The resulting blue granular solid was filtered and air dried to yield 130 g (54%) of aquated chromium tri-2- ethylhexanoate. Molecular weight determination indicated that the compound is polymeric in nature, probably due to the oxygen bridging of chromium atoms.

Anal. Calcd for $C_{24}H_{51}O_9Cr$: C, 53.8; H, 9.6; Cr, 9.7. Found: C, 53.2, H, 8.7 Cr, 9.4.

Azeotropic data indicated three molecules of water per chromium atom.

EXAMPLE II

PREPARATION OF CATALYTICALLY ACTIVE CHROMIUM TRI-2-ETHYLHEXANOATE

The active form of a typical chromium catalyst was prepared as follows:

Inactive aquated chromium III 2-ethylhexanoate, was dissolved in the parent acid (2-ethylhexanoic in this case) and then this solution was heated to 180°C for 2 hours water was removed. The solution changed from a blue-violet color to an emerald green color. The excess 2-ethylhexanoic acid was then removed under vacuum to yield the active catalyst containing unoccupied coordination sites, namely chromium III tri-2-ethylhexanoate. Alternatively, the active form can be produced in an inert solvent whose boiling point is greater than 180°C by adding some of the parent acid to this solution. However, the time to form unoccupied coordination sites is lengthened since the rate is dependent to some extent on the acid concentration. It was determined that fully aquated chromium tri-2-ethylhexanoate absorbs strongly at 2750 milimicrons while the active deaquated chromium compound does not absorb at this wave length.

Other active chromium III tricarboxylate salts such as the tripentanoate are prepared in a similar manner, using the relevant parent acid, which for the pentanoate would be pentanoic acid. Active chromium tribenzoate is prepared using sodium benzoate and benzoic acid in a manner similar to that recited above.

These and all other active forms of the chromium III tricarboxylates are air stable and will not recombine with atmospheric water to form the coordinated or inactive form of the several compounds.

The preferred chromium III tricarboxylate salts are those in which three of the six coordination sites on chromium III are unoccupied and are thus available to participate in catalysis. Here, three chromium III coordination sites are occupied by the carboxylate anions to produce a neutral molecule; the remaining three sites being unoccupied. The R side chain group of the carboxylate anions may be adjusted in order to effect the necessary solubility in various reaction media necessary for efficient catalysis. The structure of a typical chromium III tricarboxylate salt possessing three unoccupied coordination sites may be envisioned as follows:

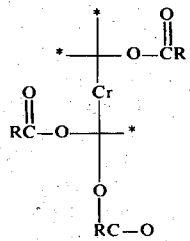

\* = Available coordination sites.

Each R may be an alkyl, aryl, alkaryl, aralkyl group, of from 1 to 18 carbon atoms.

The advantages of the present invention have been found to be obtained using any soluble trivalent chromium III tricarboxylate salt containing unoccupied coordination sites. In this form, the compounds are said to be in the activated state. Typical of such activated compounds are trivalent chromium hexanoate, trivalent chromium pentanoate, trivalent chromium butyrate, trivalent chromium 2 ethyl-hexanoate, trivalent chromium decanoate, trivalent chromium oleate, trivalent chromium 2-octanoate, trivalent chromium toluate, trivalent chromium cresylate, trivalent chromium benzoate, trivalent chromium alkylbenzoates, trivalent chromium alkoxybenzoates, trivalent chromium naphthanates and trivalent chromium alkoxide. Generally, although not necessarily, the dehydrated trivalent chromium catalysts of our invention contain in toto from about 6 to about 60 carbon atoms. We have found that these catalysts are at least somewhat soluble in the reaction system. This solubility is essential to the effectiveness of the catalyst. However, the exact degree of solubility is not critical.

The epoxide-containing compositions which can be reacted with anhydrides using our novel catalyst comprise organic materials having reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

The oxiranes which may be used in the practice of this invention include any of those materials familiar to those skilled in the art. Typical epoxy components suitable in the practice of the present invention are those disclosed in U.S. Pat. Nos. 2,500,600 and 2,324,483, the disclosures of which are expressly incorporated herein by reference.

As 1:2-epoxy compounds to be used in the present invention there may be used monoepoxides, such as butylglycide, phenylglycide, cresylglycide, 3:4-epoxy-tetra-hydrodicyclopentadienol - 8, 3:4-epoxy-hexahydrobenzal glycerol or 3:4-epoxy-cyclohexane-1:1-dimethanol-acrolein acetal. Preferred use is made of 1:2-epoxy compounds having an epoxide equivalence greater than 1, that is to say compounds containing x groups of the formula

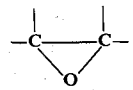

calculated from the average molecular weight, where $x$ is a whole or fractional number greater than 1.

The 1:2-epoxide groups may be either terminal or inner ones. Particularly suitable terminal 1:2-epoxide groups are 1:2-epoxyethyl or 1:2-epoxypropyl groups; the later may be linked to an oxygen atom, that is to say they are glycidylether or glycidylester groups. Compounds with inner epoxide groups contain at least one 1:2-epoxide group in an aliphatic chain

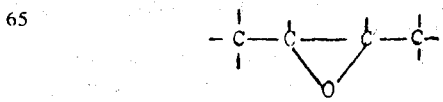

or in a cycloaliphatic ring.

As epoxy compounds containing an inner 1:2-epoxide group there are suitable expoxidized diolefins, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized, diolefinically unsaturated carboxylic acid esters, such as methyl-9:10:12:13-diepoxystearate; or the dimethyl ester of 6:7:10:11-diepoxyhexadecane-1:16-dicarboxylic acid. Furthermore, there may be mentioned epoxidized mono-, di- or poly-ethers, mono-, di- or poly-esters, mono-, di- or poly-acetals containing at least one cycloaliphatic 5-membered or 6-membered ring, to which at least one 1:2-epoxide group is linked. Suitable compounds of this kind are those of the following formulae group, such as cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, secbutyl and tert. butyl groups, halogen atoms, i.e., fluorine, chlorine, bromine or iodine, and the like.

An illustrative listing of dihydric phenols falling within this general formula includes 4,4'-dihydroxydiphenyldimethylmethane (bisphenol A), 2,4'-dihydroxydiphenylethylmethane, 3,3'-dihydroxydiphenyldiethylmethane, 3,4'-dihydroxydiphenylmethylpropylme-

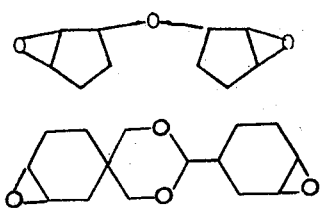

2-(3,4-epoxy)cyclohexyl-5,5-spiro(3,4-epoxy)-cyclohexane-m-dioxane.

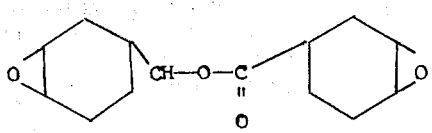

thane, 2,3'-dihydroxydiphenylethylphenylmethane, 4,4'-dihydroxydiphenylpropylphenylmethane, 4,4'-

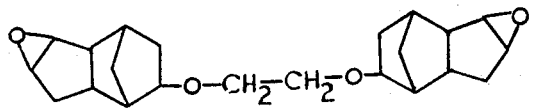

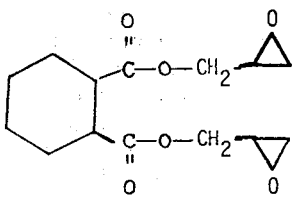

1,2-bis[5-1,2-epoxy-4,7-hexahydromethano indanoxyl]ethane.

A widely used class of polyepoxides which can be catalyzed in reaction with anhydrides according to the practice of the present invention encompasses the epoxy polyethers obtained by reacting a halogen containing epoxide or dihalohydrin, such as epichlorohydrin, epibromohydrin, 3-chloro-1,2, epoxyoctane, and the like with either a polyhydric phenol or a polyhydric alcohol.

Among the polyhydric phenols which can be used in preparing these resinous epoxy polyethers are dihydric phenols represented by the general formula:

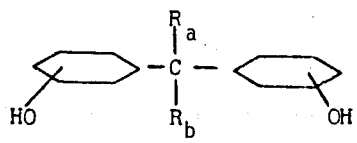

wherein the phenolic hydroxy groups may be in one of the 2,2'; 2,3'; 2,4'; 3,3'; 3,4'; or 4,4'positions on the aromatic nuclei, and each of $R_a$ and $R_b$ represent hydrogen, an alkyl group, such as methyl, ethyl, propyl, isopropyl, butyl, sec-butyl, tert.-butyl, pentyl, isopentyl, hexyl, isohexyl, and the like; a cyclo (lower)-alkyl dihydroxydiphenylbutylphenylmethane, 2,2'-dihydroxydiphenylditolylmethane, 4,4'-dihydroxydiphenyltolyllmethylmethane, 4,4-dihydroxydlphenylmethane (bisphenol F), and the like.

Other polyhydric phenols which may also be co-reacted with halohydrins to provide these epoxy polyethers are such compounds as resorcinol, hydroquinone substituted hydroquinones, and polyhydric phenols having two hydroxylaryl groups separated by an aliphatic chain of at least six carbon atoms in length, said chain being attached by carbon-to-carbon bonding to nuclear carbon atoms of the hydroxylaryl groups. Members of this latter class of polyhydric phenols can be conveniently obtained by condensing phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

The monomer products produced by this method from dihydric phenols and epichlorohydrin may be represented by the general formula, e.g., $$CH_2\text{——}CH-CH_2-O-R-O-CH_2-CH\text{——}CH_2$$

wherein R represents a divalent hydrocarbon radical of the dihydric phenol alcohol. The polymeric products will generally not be a single simple molecule but will be a complex mixture of glycidyl polyethers of the general formula:

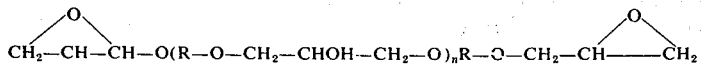

wherein R is a divalent hydrocarbon radical of the dihydric phenol and *n* is an integer of the series 0, 1, 2, 3, etc. While for any single molecule of the polyether *n* is an integer, the fact that the obtained polyether is a mixture of compounds causes the determined value for *n* to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epichlorohydrin in an alkaline medium, as per U.S. Pat. No. 2,768,153.

Among the polyhydric alcohols which can be co-reacted with a halogenated oxirane, such as epihalohydrin to provide these epoxy polyethers are such compounds as ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2′-dihydroxydiethyl sulfide, 2′2′, 3,3′-tetrahydroxydipropyl sulfide and the like, mercapto alcohols such as a-monothioglycerol, a,a′-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

The resulting reaction products may contain free terminal carboxyl groups or terminal hydroxyl groups and terminal epoxy groups, and will vary in molecular weight depending on the reactants employed, the relative amounts thereof, and the extent to which the reaction is carried out.

Another class of polymeric polyepoxides utilizeable herein, includes the epoxy novolac resins obtained by reacting, preferably in the presence of a basic catalyst, e.g., sodium or potassium hydroxide, epihalohydrin such as epichlorohydrin with the resinous condensate of an aldehyde, e.g., formaldehyde, and a monohydric aromatic alcohol, such as phenol, cresol, etc.

It is to be seen that the number of oxirane compounds suitable for use in this reaction with carboxylic acids in the presence of the catalyst compositions forming part of this invention is quite large. Some of these have been recited above, others will be recited below. In any event those not specifically recited, but which are utilizeable are set forth in *Epoxy Resins, Chemistry and Technology*, May and Tanaka, c 1973 Marcel Dekker, Inc., at Chapter 2 pages 9 to 106 inclusive; *Handbook of Epoxy Resins*, Lee and Neville, c 1967 McGraw-Hill, Inc., at Appendix 4–1 and 4–2. Still other nonenumerated types of oxiranes are recited in U.S. Pat. Nos. 3,296,208; 3,449,353, 3,542,803, 3,629,263, 3,676,456, 3,679,681, 3,697,539, 3,714,198, 3,772,326, 3,779,949, 3,784,525, and 3,784,584. These book sections and the disclosures of these patents are herein incorporated by reference.

Still another class of polymeric polyepoxides includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated expoxy-containing monomers are vinyl 2,3 glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene and the like. Another group of polyepoxides include the epoxy esters of polybasic acids such as diglycidyl phthalate and diglycidyl adipate, diglycidyl tetrahydrophthalate, diglycidyl maleate, epoxidized dimethallyl phthalate and epoxidized dicrotyl phthalate.

Among the monomeric polyepoxides which can be reacted with anhydrides per the present invention are the di- and triepoxides represented by the general formula:

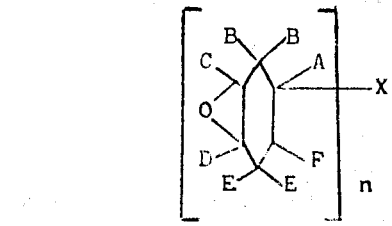

wherein A through F represent hydrogen or an alkyl group preferably a lower alkyl group having from 1 to 4 carbon atoms, inclusive, such as methyl, ethyl, propyl, n-butyl and the like, and X represents a divalent radical which can be:

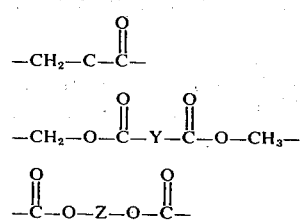

in which case *n* equals 2, or a trivalent radical which can be

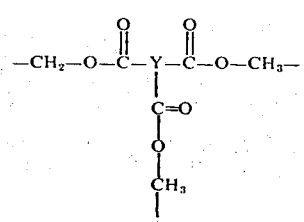

or

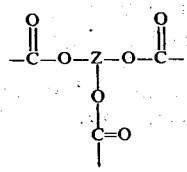

in which case *n* equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., alkylene-O-alkylene- and the like. Included among such di- and triepoxides are 3,4-epoxycyclohexylmethyl(3,4-epoxy)-cyclohexanecarboxylate; 3,4-epoxy-6-methylcyclohexylmethyl,(3,4-epoxy)-6-methylcyclohexanecarboxylate; bis(3,4-epoxycyclohexylmethyl) maleate, bis (3,4-epoxy-6-methylcyclohexylmethyl)-succinate, ethylene glycol bis (3,4-epoxycylohexanecarboxylate), 2-ethyl-1,3-hexanediol bis(3,4-epoxy-6-methylcyclohexanecarboxylate), tris(3,4-epoxycyclohexylmethyl) 1,2,4-hexanetricarboxylate, glyceryl tris (3,4-epoxy-6-methylcyclohexanecarboxylate) and the like.

Other monomeric polyepoxides which can be used include dicyclopentadiene dioxide, epoxidized triglycerides such as epoxidized glycerol trioleate, epoxidized glycerol trilinoleate, the diacetate of epoxidized glycerol trilinoleate and the like, 1,8-bis-(2,3-epoxypropoxy) octane; 1,4-bis(2,3-epoxypropoxy) cyclohexane; 1,4-bis(3,4-epoxybutoxy)-2-chlorocyclohexane; 1,3-bis (2,3-epoxypropoxy) benzene; 1,4-bis(2,3-epoxypropoxy) benzene; 1,3-bis (2-hydroxy-3,4-epoxybutoxy)benzene; benzene; 1,4-bis(2-hydroxy-4,5-epoxypentoxy) benzene; 1,3-bis(4,5-epoxypentoxy)-5-chlorobenzene; 4,4'-bis(2,3-epoxypropoxy) diphenyl ether; and epoxy esters of polybasic acids such as diglycidyl succinate, diglycidyl adipate, diglycidyl maleate, digycidyl phthalate, diglycidyl hexachloroendomethylenetetrahydrophthalate and diglycidyl 4,4'-isopropylidenedibenzoate, and the like.

Futhermore, there are suitable polyglycidylesters accessible by reacting a dicarboxylic acid with epichlorohydrin or dichlorohydrin in the presence of an alkali; such polyesters may be derived from aliphatic dicarboxylic acids, such as oxalic, succinic, glutaric, adipic, pimelic, suberic, azelaic, sebacic acid, or more especially from aromatic dicarboxylic acids, such as phthalic, isophthalic, diphenylortho: ortho'-dicarboxylic acid, ethyleneglycol-bis-(paracarboxyphenyl)-ether or the like. As examples there may be mentioned diglycidyl adipate and diglycidyl phthalate.

Many of these polepoxides, and particularly those which are polymeric can be conveniently referred to in terms of epoxy functionality, i.e., the average number of epoxy groups per molecule in the polyepoxide material. Where the polyepoxide is monomeric and all of its epoxy groups are intact, its epoxy functionality will be represented by an integer, usually 2 or greater. However, where the polyepoxide is polymeric its epoxy functionality will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

Flame-inhibiting properties in the final product may be achieved by using 1:2-epoxy compounds that additionally contain halogen, more especially chlorine or bromine. The following examples of such halogen-containing epoxy compounds may be mentioned:

Diglycidylethers of chlorinated bisphenols, 2:3-dichloro-1:4 butanediol diglycidylether, 2:3-dibromo-1:4-butanediol diglycidyl ether, 2:2. 3:3-tetrachloro-1:4-butanediol diglycidylether.

The acid anhydrides used as the curing agent in the process of the invention may be any anhydride derived from a carboxlic acid which possesses at least one anhydride group, i.e., a

The carboxylic acids used in the formation of the anhydrides may be saturated, unsaturated, aliphatic, cycloaliphatic, arematic or heterocyclic. Examples of these anhydrides include, among others, phthalic anhydride, isophthalic anhydride, di-, tetra- and hexahydrophthalic anhydride, 1,3,5,6,7,7-hexachloro-3.6-endomethylene 1,2,3,6 tetrahydrophthalic anhydride (chlorendic anhydride), succinic anhydride, maleic anhydride, chlorosuccinic anhydride, monochloromaleic anhydride, 6-ethyl-, 4-cyclohexadiene, 1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, 3-methoxy-1,2,3,6-tetrahydrophthalic acid anhydride, 3-butoxy-1,2,3,6-tetrahydrophthalic anhydride, pyromellitic anhydride, di-, tetra- and hexahydropyramellitic anhydride, polyadipic acid anhydride, polysebacic acid anhydride, and the like and mixtures thereof.

Preferred anhydrides to be employed in the process comprises the aromatic mono- and dianhydrides (i.e., those possessing two of the abovenoted anhydride groups such as pyromellitic anhydride), aliphatic and cycloaliphatic monoanhydrides, and the chlorinated derivatives of the aforedescribed mono- and dianhydrides. Especially preferred are the normally liquid or low melting anhydrides.

Other suitable agents include the trimellitic anhydride adducts of the general formula:

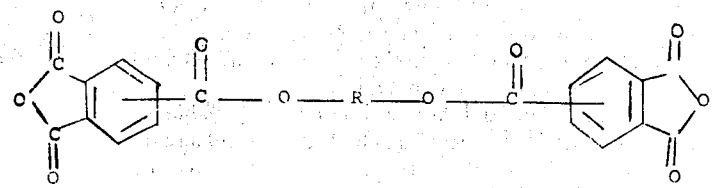

wherein R is a hydrocarbon radical, preferably having from 2 to 12 carbon atoms, and wherein the aromatic nuclei may be substituted with one or more halogen atoms and/or one or more hydrocarbyl groups. Very suitable adducts are the trimellitic anhydride-polyhydric alcohol adducts, preferably an adduct of a glycol such as ethylene glycol, and especially

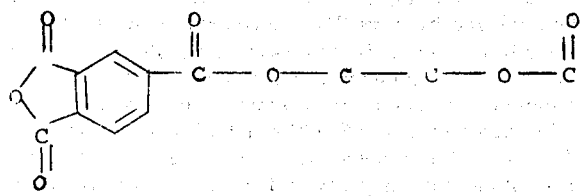

Still other suitable agents include the benzophenone tetracarboxylic diahydrides of the formula:

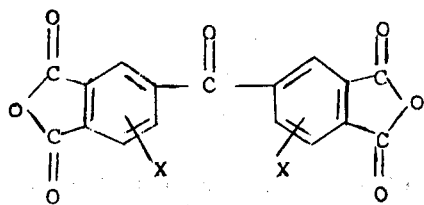

wherein X represents hydrogen, halogen, —NO —COOH, —SO$_3$H or —NH$_2$ and many be the same or different radical.

Representative benzophenone tetracarboxylic dianhydrides include, among others, 3,3',4,4'-benzophenone tetracarboxylic dianhydride; 2-bromo-3,3',4,4'-benzophenone tetracarboxylic dianhydride; and 5-nitro-3,3',4,4'-benzophenone tetracarboxylic dianhydride.

Other well known anhydrides that are utilizeable here are the polyfunctional cyclic anhydrides. Among these, mention may be made of pyromellitic tetracarboxylic acid dianhydride, cyclopentane tetracarboxylic acid dianhydride, diphenylether tetracarboxylic acid dianhydride, and the hexacarboxylic acid trianhydrides of benzene, and of cyclohexane.

Other useful anhydrides include the linear or cyclic anhydrides of any of the following acids; oxalic acid, malonic acid, glutaric acid, adipic acid, pimelic acid, azelaic acid, sebacic acid, brassylic acid, trimellitic acid, dimer fatty acid, trimer fatty acid and the polyester acid, such as the diacid from an excess of azelaic acid and neopentyl glycol sold under the tradename "Emery Diacid", by Emery Chemical Company and having an equivalent weight of 500.

As will be apparent to those skilled in the art, the ratio of oxirane to organic polybasic acid anhydride may be varied over a wide range, depending upon the functionality of the reactants and the properties desired in the final cured product. Normally, for a tough, hard product, at least one of the two coreactants should have a functionality greater than one.

It has been found that any compound capable of polarizing the carboxylic acid anhydride to yield a reactive carboxylic acid moiety can be utilized as the cocatalyst. The cocatalyst acts to open up the anhydride ring to form an acid moiety and the acid moiety then reacts with the oxirane compound in the presence of the active chromium III compound.

Among the cocatalysts that can be utilized herein are the fully substituted compounds of the following types:

1. Quaternary Ammonium Hydroxides and halides of the formulae:

wherein $X =$ F, Br, Cl, I.

2. Quaternary Phosphonium halides of the formula:

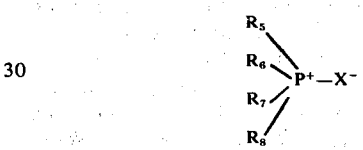

3. Arsines of the formula:

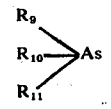

4. Amine oxides of the formula:

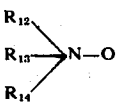

5. Aminophenols of the formula:

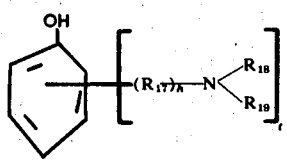

$t=$1,2 or 3.

6. Phosphine Oxides of the formula:

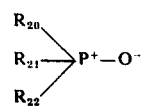

7. Phosphines of the formula:

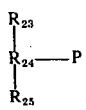

8. Amines of the formulae:

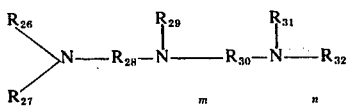

$m = 0$ or $1$, $n = 0$ or $1$, and if $m = o$, $n = o$

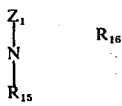

and

wherein $Z_1$ and $Z_2$ each represent the remaining atoms necessary to complete a heterocyclic ring nucleus, wherein $Z_1$ contains carbon atoms and any of nitrogen, oxygen and phosphorous atoms, said $Z_1$ heterocyclic nucleus being selected from the group consisting of pyrrolyl, imidazolyl, pyrazolyl, isoindolyl, indolyl, indazolyl, purinyl, carbazonlyl, B carbolinyl, pyrrolidnyl, pyrrolinyl, phentothiazinyl, perinidinyl, phenoxazinyl, imidazolidinyl, imidazolinyl, pyrazolindinyl, pyrazolinyl, isoindolinyl, quinuclindinyl, morpholinyl, phosphoromorpholinyl, piperidyl, piperazinyl, indolinyl, and said $Z_2$ heterocyclic nucleus being selected from the group consisting of pyridyl, pyrazinyl, pyrimidinyl, pyridazinyl, indolizinyl, cinnolinyl, pteridinyl, phenanthridinyl, acridinyl, phenanthrolinyl, isoxazolyl, furazanyl, and benzoisoquinolinyl, $R_{15}$ is an alkyl or haloakyl group of from 1 to 6 carbon atoms.

$R_{16}$ represents the nonreactive substituents attached to all of the atoms of the heterocyclic nucleus formed from Z and the N atom attached thereto.

wherein $R_1$ through $R_{14}$, $R_{20}$ through $R_{27}$, $R_{29}$, $R_{31}$ and $R_{32}$ may be any of the same or different alkyl [$C_1$ to $C_{12}$], cycloalkyl of 4 to 7 carbon atoms in the ring, aryl, aralkyl wherein the alkyl portion is $C_1$ to $C_6$, alkyaryl wherein the alkyl portion is $C_1$ to $C_6$, and $C_1$ to $C_6$ refers to the number of carbon atoms;

further, wherein $R_{17}$ is an alkyl group of 1 to 2 carbon atoms and $h$ is a number of 1 or 0. $R_{18}$ and $R_{19}$ are alkyl groups of 1 to 6 carbon atoms, $R_{28}$ and $R_{30}$, $R_{15}$ and $R_{16}$ are each alkyl groups of 2 to 6 carbon atoms, Any and all of the R groups $R_1$ to $R_{32}$ may obtain one or more Z substituents thereupon wherein said Z substituents are groups that are noninterferring with the catalytic activity and non-reactive with the chromium catalyst, the anhydride, the oxirane compound or the cocatalyst or acceleration of present and said Z substitutents are free from labile hydrogen. By labile hydrogen we mean the hydrogens in such groups as hydroxyl, carboxyl, primary and secondary amine and thio. Although a sole co-catalyst may be effective, combinations of two or co-catalysts can be used and may be preferred in conjunction with the chromium compounds.

Furthermore, each cocatalyst or combinations thereof when used in conjunction with the chromium compounds, can have a reactive promoter employed as a third class of component for the catalytic composition. Such reactive promoters include the phenols of the formula:

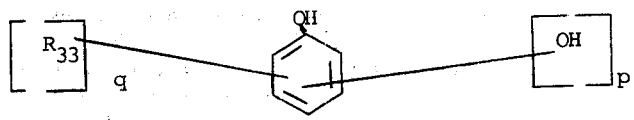

wherein $R_{33}$ represents all of the organic carbon chains that can replace the aromatic protons on the aryl ring, and can be the same or different alkyl, aryl, alkaryl, and aralkyl groups with a total carbon atom content of all the R groups constituting $R_{33}$ being up to 15 carbon atoms, and wherein the aromatic protons which are not replaced by R33 or OH groups are H, and $p$ is a number of 1 or 0, and $q$ is a number of from 0 to 5, the sum of $p$ and $q$ being no more than 5.

Those R groups other than $R_{17}$, $R_{18}$, $R_{19}$, $R_{28}$ and $R_{30}$ may be straight-chain, branched-chain, saturated or unsaturated including ethylenic and acetylenic unsaturation. Exemplifying such groups are methyl, ethyl, n-propyl, isopropyl, n-butyl, isobutyl, sec-butyl, tert-butyl, amyl, hexyl, octyl, decyl, dodecyl, hexadecyl, octadecyl, propenyl, allyl, buttenyl, propargyl, octadecenyl, cyclopentyl, cyclohexyl, cyclohexenyl, phenyl, totyl, xylyl, ethylphenyl, styryl and dodecylphenyl, chlorophenyl, cyanoethyl, phenoxyphenyl, tertiary amido, e.g., N-diethylethyl, dibutyl, dipropyl, and the like.

Other reactive promoters include monocarboxylic acids and monoalcohols of the formulae R34OH and $R_{35}$ COOH wherein $R_{34}$ and $R_{35}$ are aliphatic hydrocarbon groups of 1 to 9 carbon atoms.

Compounds which include two or more of the co-catalytic functional groups or which combine cocatalyst and promoter groups include:

9. Phosphoramides:

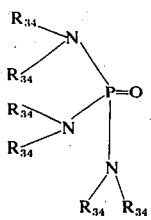

10. Phosphineamines:

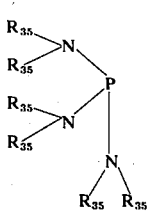

11. Tertiary Amino Phenols: See type (5) above. wherein $R_{34}$ and $R_{35}$ are alkyl and haloalkyl groups of 1 to 6 carbon atoms; and others all of which have dual cocatalyst functionality.

Among the quaternary ammonium hydroxides and halides of Group (1) utilizeable herein mention may be made of benzyltrimethylammonium hydroxide and halides; benzyltriethylammonium hydroxide and halides; tetramethylammonium, hydroxide or halides; diphenyldimethylammonium, hydroxide and halides; diphenyldimethylammonium hydroxide and halides, wherein the halides include the iodide, bromide and chloride, and tetraethyl ammonium hydroxide and its corresponding halides. Typical phosphonium halides of Group (2) include triidodecylphosphonium chloride, and tridecylphosphonium bromide.

Arsines suitable as catalysts include but are not limited to: trimethyl phosphine, tricylohexyl arsine, triphenyl arsine, trioctyl arsine, diphenyl butyl arsine, trixylyl arsine, tridecyl arsine, dicyclohexyl arsine, and tricyclohexenly arsine, triphenyl phosphine, diphenyl cyclohexyl phosphine, tributyl phosphine, trixylyl phosphine, tridodecyl phosphine, cyclohexyl octyl phosphine and the like. Particularly preferred arsines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and preferably are not more than 9 carbon atoms.

Among the amine oxides utilizeable as cocatalysts herein, mention may be made of pyridine N-oxide, dimethyldodecenylamine N-oxide, trimethylamine N-oxide.

Aminophenols which may be utilized in this invention include: dimethyl amino methyl phenol, tris(-dimethyl amino methyl) phenol.

Trihydrocarbon phosphines and trihydrocarbon phosphine oxides. suitable for use as a cocatalyst include:

tri n-butylphosphine, trioctylphosphine oxide, triphenyl phosphine oxide, tri beta chloroethyl phosphine, triphenyl phosphine, tri-butyl phosphine oxide, Typical tertiary amine cocatalysts include:

N,N.-dimethylbenzylamine, N,N-diethylbenzylamine, triethylamine, N,N-dimethylaniline, N-methyl-morpholine, N-ethylmorpholine, imidazole and tetrachloromethyl ethylene amine, tetramethyl guanidine, triisopropylamine, pyridine, piperazine, triethylamine, tributylamine, dimethyl benzylamine, triphenyl amine, tricyclohexylamine, quinoline, triethylamines, triphenylamine, tri(2,3-dimethyl cyclohexyl) amine.

As members of the phenol family of compounds which enhance the reaction rate as reaction promoters, mention may be made of phenol, (the compound), cresol, resorcinol, catechol, carvacrol, phloroglucinol, dimethyl phenol and naphthol. It is to be seen that several of the cocatalytic moieties can be present on one molecule and that a molecule combining the phenol moiety and a cocatlytic moiety can also be combined as for example in the aminophenol; examples of which have been previously mentioned.

While only low molecular weight monofunctional alcohols and monofunctional acids are mentioned as reactive promoters, it is seen that it is the presence of the —OH or —COOH group which acts to review the anhydride ring. The reactive promoters are deemed such, since unlike ordinary catalysts they participate in the reaction, yet are present only in small quantities, thus bifunctional and higher functional acids and alcohols which usually are added in reasonable amounts will act to sever the anhydride ring as well. However these latter unlike our defined reactive promoters, will not only measurably affect the reaction rate but also have an affect on the physical properties of the end product as well.

The cocatalyst systems of this invention should be utilized on a 0.01% to 10% level. Neither the ring opener nor the active chromium agent minimum amount should be less than about 0.015%. The reactive promoters are utilized at levels up to 30% of the weight of the cocatalyst system. The following examples are presented solely to illustrate the invention and should not be regarded as limiting in any way. In the examples, the parts, percentages and ratios are by weight unless otherwise indicated.

EXAMPLE III

To a stoichiomotric mixture of methyl nadic anhydride and DER-332 (Dow Epoxy Resin-332, the epicholorohydrin adduct of bisphenol A) was added 2% of a cocatalyst solution containing tetrabutylammonium hydroxide and active chromium III tri-2-ethylhexanoate(COT), prepared as described in Example II (1/1 molar). The resulting solution was maintained at 110°F for 20 minutes at which time gelation occurred to yield a rigid, high strength polymer. At room temperature, 2 hours were required for gelation. In the absence of either COT or the quaternary ammonium hydroxide cure times in excess of 2 hours at 110°F were required for gelation and the resulting polymers exhibited inferior physical properties. Use of an amine oxide with an active $Cr^{III}$ compound.

EXAMPLE IV

A stoichiometric mixture of methyl nadic anhydride and DER-332 was combined with 2% of a cocatalyst mixture of tyridino N-oxide and the catalyst prepared in Example II (1/1 molar). The resulting solution was placed in a 110°F oven. After 5 minutes, gelation accompanied by a vigorous exotherm, resulted in a fully cured partially charred sample. In the absence of either COT or the amine oxide, gelation did not occur after 2 hours at 110°F. Use of tetrapropylammonium bromide.

EXAMPLE V

A stoichiometric mixture of methyl nadic anhydride and DER-332 was mixed with 2% of a cocatalyst mixture of $(CH_3 CH_2 CH_2)_4 NB_r$ the catalyst of Example II (1/1 molar) and maintained at 110°F. After 25 minutes the polymer solution gelled to a hard durable mass. In the absence of either the active chromium III salt or TPAB, substantially longer cure cycles were required for polymerization.

EXAMPLE VI — Three Component Catalyst System

A stoichiometric mixture of methyl nadic anhydride and DER-332 was treated with 2% of a solution containing N,N-dimethylbenzylamine, phenol and the catalyst of Example II (1 to 1 to 2 molar). The catalyzed mixture gelled in 15 minutes at 110°F, or 2 hours at 77°F, to yield a hard resilient polymer. In the absence of any of the amine, phenol or the active chromium III salt, substantially longer times were required for polymer cure.

Amine cocatalyst system

EXAMPLE VIII

The epoxy resin is prepared from equal weight amounts of diglycidyl ether of 2,2-di(p-hydroxyphenyl) propane and methyl nadic anhydride. The catalyst of Example II and tertiary amine catalysts are mixed in the resin system as follows, active chromium III salt 3% and N,N-dimethylbenzylamine 1%. The reaction gave rise to a hard crosslinked product at room temperature after about 6 hours.

EXAMPLE VIII

An anhydride/epoxide mixture consisted of a 1:1 weight ratio of methyl nadic anhydride; DER-332 was used in this example. Ten gms of the anhydride-epoxide mixture was combined with 0.3 gms (3.0%) of the cocatalyst of Example VII alone and its gel time measured at 100°C. Then an additional 10 gms of the resin were combined with 0.3 gms (3.0%) of the corresponding synergistic catalyst mixture which was also measured for gel time in the same manner. The COT was prepared in accordance with Example II.

Other experiments were carried out to set forth the synergistic capability of the active chromium carboxylates in conjuction with certain compounds. For these experiments, the chromium salt utilized was activated chromium octoate. When this chromium salt was used as the sole catalyst with for the reaction between methyl nadic anhydride and the DER-332 (bisphenol A — epichlorohydrin reaction product), the gel time at 100°C was 40 minutes. Continued cure at this temperature, up to about 5 hours, improves the properties of the product to a slight extent. The polymerizate here was not highly crosslinked, as is the case for those made with the two component synergistic catalyst systems set forth below. The products emanating from the system below, were hard products after the time set forth, and required no further curing.

EXAMPLE IX

| Category Compound Used in Conjunction with Active Chromium Salt | Gel Time at 100°C Cocatalyst Component Alone 3% conc. | Cocatalyst + Active Chromium Octoate 3% conc. |
|---|---|---|
| a. Quaternary Ammonium Halide | | |
| (a) Tetrapropyl ammonium bromide | 10000 sec | 800 sec |
| (b) Tetrapropyl ammonium chloride | 10000 sec | 800 sec |
| b. Quaternary phosphonium halide | | |
| (a) Tributyl dodecylphosphonium iodide | 2500 sec | 90 sec |
| c. Tertiaryamine oxide | | |
| (a) Pyridine N-oxide | 6000 sec | 95 sec |
| (b) Trimethylamine N-oxide | 3100 sec | 170 sec |
| (c) Dimethyldodecenylamine N-oxide | (no gel, 5 hrs) | 110 sec |
| d. Trisubstituted organic phosphine | | |
| (a) Tri n-butylphosphine | (poor gel, 5 hrs) | 143 sec |
| e. Tertiaryarsine | | |
| (a) Tri n-butylarsine | (no gel, 5 hrs) | 325 sec |
| f. Tri-substituted phosphine oxides | | |
| (a) Hexamethylphosphorictriamide | (no gel, 18 hrs) | 102 sec |
| (b) Trioctyl phosphine oxide | (no gel, 40 hrs) | 330 sec |
| (c) Triphenyl phospine oxide | (no gel, 40 hrs) | 300 sec |
| g. Tertiary amines | | |
| (a) tetramethylethylenediamine | 1,420 sec | 100 sec |
| (b) Tetramethylguanidine | 4,200 sec | 67 sec |
| (c) N,N-dimethylbenzylamine | 1,825 sec | 102 sec |
| h. Aminophenol | | |
| (a) 2,4,6-tris(dimethylamino) phenol | 1,410 sec | 134 sec |
| i. None (control) | | 2400 sec soft product. |

It is seen that when the typical activated chromium salt is used alone, the gel time is 40 minutes. This is reduced to a maximum of under 6 minutes for those systems set forth above. This is almost a seven fold time increase in the gelation rate. In fact the ultimate cure time and gelation time for the synergistic combination system products were essentially identical.

EXAMPLE X

The resin system comprising 7.7 parts DER-332, 2.9 parts Emery diacid 3389R and 7.9 parts dodecenyl succinic anhydride is treated with 2% active chromium III pentanoate and 2% triphenyl amine. A good cure rate was observed at about 30°–60°C.

EXAMPLE XI

Hexahydrophthalic anhydride (154 grams) was mixed with 3,4-epoxycyclohexane carboxylate (133 grams). After homogeneous mixing several ten grams of samples were removed and combined with 0.3 grams of the following catalyst systems at 57°C.

|   |   | GEL TIME |
|---|---|---|
| A. | Control - no catalyst | No change after 24 hours |
| B. | Activated chromium octoate only | Rubbery gel afte 2 hours |
| C. | Triphenyl phosphine only | 6½ hours |
| D. | Combination of C and B in 2:1 Molar ratio | 30 minutes |
| E. | Trioctyl phosphine oxide only | Rubbery gel after 18 hours |
| F. | Combination of E and B in 2:1 Molar ratio | 1 hour |
| G. | N,N-dimethylbenzylamine only | 6 hours |
| H. | Combination of G and B in 2:1 Molar ratio | 20 minutes |

The use of a member of each of the 9 recited cocatalysts classes have been demonstrated in the preceding examples with an active chromium carboxylate in an anhydride-epoxy system.

When different active chromium three compounds are utilized in conjunction with the particular cocatalyst of any one example, similar synergistic results are obtained.

It is to be understood that while one would believe that subsequent to the severing of the anhydride ring to form a carboxylic acid moiety, that the reaction of the newly formed acid group with oxirane moieties would be similar to the reaction of a starting material acid with an oxirane in the presence of the active chromium compound, such is not the case.

This is seen below, wherein for the sake of ease of illustration monofunctional reactants are utilized.

ness of each class of component,-namely active chromium salt, and cocatalyst-, alone and as part of the synergistic combination of this invention, experiments were conducted wherein only the relative proportion of the catalyst system components were varied.

EXAMPLE XII

An epoxy resin system was prepared by mixing equal weight amounts of DER-332 (diglycidyl ether of 2,2-di(p-hydroxyphenyl) propane) and methylnadic anhydride. Various amounts of the chromium salt catalysts and tertiary amine catalysts were mixed in the resin system. Curing was conducted as shown in the following table and gel times recorded.

TABLE 1

| Catalyst | 55°C | 25°C |
|---|---|---|
| 3% Chrome Octoate Alone | 150 min. | 60 hrs. |
| 2% Chrome Octoate ≠ 1% N,N-Dimethylbenzylamine | 14 min. | 6 hrs. |
| 1% Chrome Octoate ≠ 2% N,N-Dimethylbenzylamine | 38 min. | 13 hrs. |
| 3% N,N-Dimethylbenzylamine alone | 300 min. | still liquid 72 hrs. |

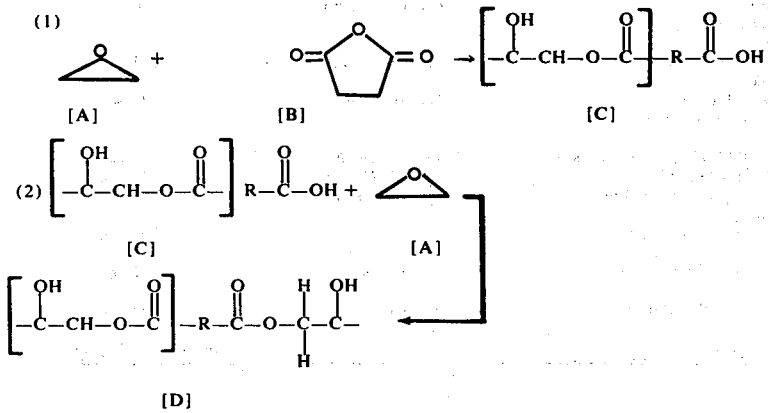

Then D which is hydroxyl terminated reacts with another anhydride molecule B to yield another C.

This tripartite reaction utilizes 2 equivalents of anhydride per one equivalent of epoxide.

In the acid starting material situation, there is no No. 3 reaction. The alcohol terminal is not consumed because at the temperature of reaction of —R'COOH with, the acid oxirane reaction will take place preferentially to the beta hydroxyl - oxirane reaction. Thus the equivalent basis is 1:1 as each acid moiety has a lower number of cross-linking sites available. Previously it has been set forth as to what amounts of the catalyst should be employed with the active chromium III carboxylate. In order to demonstrate the relative effective- The 3% is based on the weight of the Monomer mixture.

Chain extended (linear) products can be obtained when the oxirane compound is monofunctional, i.e., 1,2-butylene oxide, and the anhydride is monofunctional cyclic or polyfunctional linear, such as maleic anhydride and polyazelaic anhydride.

EXAMPLE XIII

In order to illustrate the fact that the cocatalyst members can be utilized in conjunction with each other in the presence of the active chromium salt, trioctyl phosphine oxide, N,N-dimethylbenzylamine, and chromium octoate were mixed in a 1:1:1 molar ratio at a total level of 3% as the catalyst system for the reaction of DER-332 with methyl nadic anhydride. The gelation time at 100°C. was 180 seconds. It was found that the preparation and use of such multicomponent system proceeded in the same manner as if one were preparing a standard two component catalyst system reaction mixture. When the activated chromium octoate was not used as in a second sample for reaction, and the cocatalyst component amounts were enlarged to match the total weight of catalyst of the three component system, the gelation time at 100°C was 92 minutes. As mentioned previously the presence of phenol further enhances the catalytic capability of these synergistic combinations. Thus for a typical anhydride epoxide reaction mixture which required 102 seconds to gel when the catalyst was N,N-dimethylbenzylamine with activated chromium octoate in a 2:1 molar ratio, the rate was reduced to 80 seconds for 1:1:1 ratio wherein 1 molar part amine was replaced by 1 molar part of phenol.

It may be advantageous in some instances to utilize multicomponent catalyst systems for economic or availability reasons.

It is also to be seen that this invention contemplates the use of one or more members of the same cocatalyst family together. For instance, the cocatalyst component may consist of two different tertiary amines. When such is done, the two members utilized as the cocatalyst component are used in individual amounts whose sum would equal the portion allocated to a single cocatalyst if one were used.

It has been found that the active chromium III compounds and the cocatalysts of this invention are mutually compatible in all proportions, providing an easily stored mixture. These catalyst mixtures can also be stored in the presence of the organic polybasic acid anhydride, prior to mixing with an epoxy compound. Thus it was found that when 95 grams of dodecenyl succinic anhydride, 5 grams of a 1:1:1 molar ratio of activated chromium octoate, N,N-dimethylbenzylamine and phenol were stored in a closed vessel for about 1 year at room temperature, no visible change was seen upon opening of the vessel. This mixture was stoichiometrically reacted with an oxirane compound to give a product similar to one prepared from a fresh reaction mix.

When alcohols and carboxylic acids are used in conjunction with a synergistic cocatalyst mixture, the reaction rate is increased. However, since it is known that both of these materials enter into reaction with one or the other of the monomers, we believe the rate enhancement is due to the formation of additional polymer initiation points. Phenol on the other hand is believed to be regenerated after each reaction, and would therefore be available throughout the overall reaction. Such a behavior is more in keeping with the classical view of homogeneous catalysis, wherein catalyst is not consumed. By the nature of their utility in this reaction these compounds are designated as reactive accelerators.

EXAMPLE XIV

A stoichiometric mixture of methyl nadic anhydride and DER-332 was mixed with 2% of a co-catalyst solution of 2-ethylhexanoic acid, N,N-dimethylbenzylamine and the catalyst of Example II (1 to 1 to 1 molar) and placed in a 110°F oven. Gelation of the catalyzed mixture occurred after 40 minutes. In the absence of the carboxylic acid, longer cure cycles were required to achieve polymerization.

EXAMPLE XV

A solution containing 80 equivalents of maleic anhydride and 110 equivalents of DER-332 was treated with a catalyst mixture comprising 15 equivalents of Emery Diacid 1025-107 (the polyester diacid derived from an excess of azelaic acid and neopentyl glycol — Emery Chemical Company), 5 equivalents of LD-124 diol (1,4-polybutylene glycol) and 3% of the catalyst of Example II. The mixture gelled in 5 minutes at 135°F or 7 minutes at 77°F to yield a tough rubbery polymer. In the absence of the polycarboxylic acid, and/or polyol gel times were longer and/or the properties of the polymerized product were different.

EXAMPLE XVI

The resin system comprising 7.7 parts DER-332, 4.62 parts of hexahydrophthalic anhydride and 2.0 parts of Emery dimer acid (a diacid obtained by dimerization of an unsaturated $C_{18}$ fatty acid and having an equivalent weight of 290) is catalyzed with 2% active chromium III decanoate, prepared in essentially the same manner as the catalyst of Example II, and 2% N,N-dimethylbenzylamine. Curing occurs at room temperature after about 6 hours. Without dimer acid longer curing time is required.

EXAMPLE XVII

The resin system comprising 7.7 parts DER-332, 2.9 parts Emery diacid 3389R and 7.9 parts dodecenyl succinic anhydride is treated with 2% active chromium III pentanoate and 2% triphenyl amine. Rapid cure rates were observed in the range of from 30°C to 60°C. The absence of acid is seen to lower the observeable cure rates, and to change the polymer properties.

Certain solvents known as deactivating solvents, have the capacity to temporarily coordinate the active form of the chromium catalyst to render it inactive. The coordination sites are filled by electrons of the solvent thereby rendering the catalyst inactive. Upon removal of the solvent, as by volatilization, the chromium compound is rendered re-active. Such solvents are either protic or aprotic electron donating solvents. Details concerning the temporary inhibition of the chromium catalyst are set forth and claimed in U.S. Pat. No. 3,635,869, and assigned to the same party as this application.

For use in the anhydride oxirane reaction, only the aprotic solvents such as dimethyl formamide, dimethylacetamide, nitroethane, n-methyl pyrollidone and other electron donating can be utilized to temporarily render the active chromium compound inactive. Protic solvents such as methanol will preferentially act as reactive promoters toward the severance of the anhydride rather than as a coordinator of the chromium salt.

When a stated portion of an oxirane and of a carboxylic acid anhydride are mixed together in the presence of a cocatalyst system of this invention in dimethyl formamide in a sealed system, to prevent evaporation, minimal reaction will take place, even after twenty-four hours, until the solvent is removed as by volatilization or centrifugation, this is because absent the activity of the chromium catalyst, the anhydride ring severing cocatalyst will not act to aid in the oxirane based polymerization. The presence of impurities such as water, are the cause of the minimal reaction that may take place.

EXAMPLE XVIII

In order to illustrate the storeability of the anhydride-oxirane system at various temperatures in the presence of a combined active or catalytic form of a chromium +++ tricarboxylate and one of the enumerated cocatalysts, five day storage tests are conducted with measurements of properties being made at one day intervals wherein the solvent systems utilized were both the deactivating and the non-deactivating of the catalytic capability of the non-hydrate chromium III carboxylates.

(a) When equi-equivalent portions of nadic methyl anhydride (NMA) and the compound 1 (2,3-epoxy-proppyleneoxy)-2,6,di-(1,2,-epoxypropyl)benzene, sold by Shell under the tradename EPON X-801, an 0.5% active chromium carboxylate and 0.5% of BDMA in both tolune and xylene at solvent to resin ratios of 2/1 there was rapid gelation, at 77°F.

(b) When a different oxirane was utilized at a slightly higher catalyst content, the results were similar, at room temperature.

(c) Wne NMA anhydride is mixed with an oxirane compound and a catalytic amount of a cocatalyst system of the active form of a chromium +++ octoate and BDMA, in dimethylacetamide, the solution after thorough mixing is divided into three portions. On each was stored for 5 days at 35°, 77° and 135°F. The viscosity of the samples stored at 35° and 77°F was unchanged. The third sample showed a slight increase in viscosity, as measured by an increased time for a bubble to rise through a two inch column height of the sample when placed in a vial. Since the dimethylacetamide is a deactivating solvent for the active chromium +++ tricarboxylate the reduced viscosity if observed in comparison to Example XVIII (a) and (b) above.

EXAMPLE XIX

A six-ply laminate was prepared by solution coating from DMF, a glass fabric, using activated chromium tricarboxylate and containing a stoichiometric amount of each of CPDA and epoxy novalak (DEN 438). This coated glass was dried in a warm air circulating oven for about ten hours. The laminate was press cured at ≈ 100 psi at over 300°F. for about 2 hours, to for a composite.

Typical polymerizates prepared according to the process of the present invention, are seen to possess tensile strengths on the order of 60,000 to 95,000 psi and elongations of from about 0.5 to 1.0 percent.

EXAMPLE XX

In order to demonstrate the adhesive capability of compositions prepared according to this invention, a typical one was utilized in the preparation of lap shear specimens wherein two steel plates are overlapped one inch and cemented or bonded together, successful bonding was achieved.

Since the compositions of this invention are relatively low in cost, possess excellent adhesive properties to many materials and good abrasion resistance, and are useful as protective coatings for metal surfaces, and as adhesives, they find commercial acceptability for these purposes, since the two components and the deactivated catalyst can be put into the same container without the fear of set up if the precaution is taken as discussed in detail above, to maintain the deactivation of the catalyst.

Alternatively, the organic acid anhydride-epoxy material can be premixed and stored with little or no reaction until the catalyst mixture is added. Thus, it can be seen that the synergistic catalyst mixtures of the present invention provide great flexibility in use and formulation. For this reason, the synergistic catalyst mixtures of this invention may be readily adapted to all of the conventional epoxy compound mixing, blending and curing equipment.

It should also be noted that one or more than one compound of each class of epoxides may be reacted with one or more than one anhydride. Thus a monomeric monofunctional oxirane could be used in conjunction with a polyfunctional polymeric epoxide, for example in this reaction. Similarly mono and polyanhydrides can be utilized together.

It is also contemplated by this invention to prepare prepolymers, or partial polymerizates by utilizing techniques known to the polymer art as for instance by control of monomer ratios.

Furthermore, the curable mixtures of the invention may be mixed at any stage prior to the completion of the degree of reaction possible as limited by the amount of one of the reactants, with fillers, plasticizers, pigments, dyestuffs, flame-inhibitors, mould lubricants or the like. Suitable extenders and filters are, for example, asphalt, bitumen, glass fibers, mica, quartz, meal, cellulose, kaolin, ground dolomite, colloidal silica having a large specific surface (Aerosil) or metal powders, such as aluminum or boron powder.

The curable mixtures may be used in the unfilled or filled state, neat or as in the form of organic solutions, as laminating resins, paints, lacquers, dipping resins, moulding compositions, coating compositions, pore fillers, floor coverings, potting and insulating compounds for electrical industry, adhesives and the like, and also in the manufacture of such products. Typical surfaces that can be adhered or coated include metals, wood, glass and plastics.

To prepare a totally cured or hardened product, the application of heat may be necessary. The temperature to which the rigid partially cured solid is to be subjected to, in order to obtain total curing, is that temperature which equals or exceeds the heat distortion temperature of the totally cured system, which can vary from room temperature to several hundred degrees centigrade. The time required to accomplish this final or post cure is dependent upon the reactants utilized, the catalyst level and the temperature at which it is carried out. The time may vary from about 20 seconds to as much as several hours.

Since certain changes may be made in the above compositions and processes without departing from the scope of the invention herein involved, it is intended that all matter contained in the above description shall be interpreted as illustrative and not in a limiting sense.

We claim:

1. A novel synergistic catalyst mixture for use in curing epoxy compounds consisting essentially of:
    15 to about 85% by weight of a catalytically active CrIII tricarboxylate which is emerald green in color, showing an absence of absorption at 2750 millimicrons and is a compound of the general empirical formula:

$$Cr(OOCR)_3$$

where R is selected from the group consisting of alkyl, aryl, alkaryl and aralkyl of 1-18 carbon atoms; and 15 to about 85% by weight of a cocatalyst capable of polarizing a carboxylic acid anhydride to yield a reactive carboxylic acid moiety, said cocatalyst being at least one member selected from the group consisting of quaternary-substituted ammonium hydroxides; quaternary-substituted ammonium halides; tri-substituted arsines; quaternary-substituted phosphonium halides; tri-substituted amine oxides; tri-substituted phosphine oxides; tri-substituted phosphines; tri-substituted amines; and mixtures thereof where the substituents are selected from the group consisting of alkyl, aryl, aralkyl and alkaryl and in the case of phosphines and phosphine oxides, the substituent can also be dialkylamino and in the case of amines, the substituent can also be

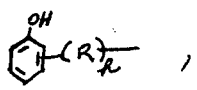

wherein R is alkyl of 1 to 2 carbon atoms and $h$ is 1 or 0.

2. A catalyst mixture according to claim 1 in which the cocatalyst further includes an effective promoting amount up to 30% by weight of the cocatalyst of a promoter selected from the group consisting of phenols, low molecular weight mono-carboxylic acids and low molecular weight mono-alcohols.

3. A catalyst mixture according to claim 1 in which the cocatalyst is a tertiary amine.

4. A catalyst mixture according to claim 3 in which the tertiary amine is a tertiary amino phenol.

5. A catalyst mixture according to claim 2 in which the promoting material is a phenol.

6. A catalyst mixture according to claim 5 in which the tertiary amine is N,N-dimethylbenzylamine.

7. A catalyst mixture according to claim 6 in which the active CrIII carboxylate is active, green chromium III 2-ethylhexanoate and the phenol is phenol.

8. A catalyst according to claim 3 in which the molar ratio of chromium carboxylate to tertiary amine is about 2:1.

9. A novel synergistic catalyst mixture for use in curing epoxy compounds consisting essentially of:

15 to about 85% by weight of a catalytically active CrIII carboxylate which is prepared by heating a solution of blue-violet CrIII tricarboxylate containing three molecules of hydrated water in the parent acid of the carboxylate to a temperature of at least 180°C until the solution turns emerald green and the carboxylate does not absorb at 2750 millimicrons; and 15 to about 85% by weight of a cocatalyst capable of polarizing a carboxylic acid anhydride to yield a reactive carboxylic acid moiety, said cocatalyst being at least one member selected from the group consisting of quaternary-substituted ammonium hydroxides; quaternary-substituted ammonium halides; tri-substituted arsines; quaternary-substituted phosphonium halides; tri-substituted amine oxides; tri-substituted phosphine oxides; tri-substituted phosphines; tri-substituted amines; and mixtures thereof where the substituents are selected from the group consisting of alkyl, aryl, aralkyl and alkaryl and in the case of phosphines and phosphine oxides, the substituent can also be dialkylamino.

10. A catalyst mixture according to claim 9 in which the carboxylate is CrIII 2-ethylhexanoate and the parent acid is 2-ethylhexanoic acid.

11. A catalyst mixture according to claim 9 in which the cocatalyst further includes an effective promoting amount up to 30% by weight of the cocatalyst of a promoter selected from the group consisting of phenols, low molecular weight mono-carboxylic acids and low molecular weight mono-alcohols.

12. A catalyst mixture according to claim 11 in which the cocatalyst is a tertiary amine and the promoter is a phenol.

* * * * *

UNITED STATES PATENT AND TRADEMARK OFFICE
CERTIFICATE OF CORRECTION

PATENT NO. : 3,977,996

DATED : August 31, 1976

INVENTOR(S) : Arthur Katzakian, Jr., Herman H. Weyland, Roger B. Steele, Marvin H. Gold It is certified that error appears in the above-identified patent and that said Letters Patent are hereby corrected as shown below:

Column 3 after line 55 correct the formula to

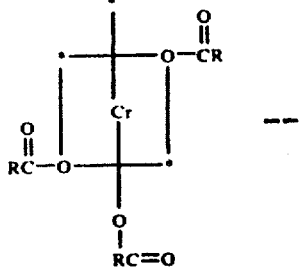

* = Available coordination sites.

Column 6 line 44 change "tolyllmethylmethane" to -- tolylmethylmethane --

Column 13 after line 22 correct the formula to

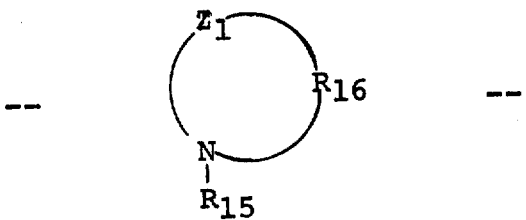

Column 13 after line 41 correct the formula to

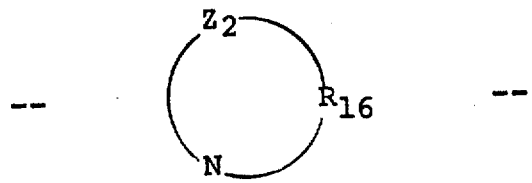

Signed and Sealed this

Twenty-third Day of November 1976

[SEAL]

Attest:

RUTH C. MASON
Attesting Officer

C. MARSHALL DANN
Commissioner of Patents and Trademarks